United States Patent
Voss

(10) Patent No.: US 6,409,494 B1
(45) Date of Patent: Jun. 25, 2002

(54) DEVICE FOR THE EXTRUSION OF MULTI-LAYER PLASTIC FILMS, BOARDS OR TUBES

(75) Inventor: Klaus-Peter Voss, deceased, late of Lengerich (DE), by Jana Vanessa Voss, legal representative

(73) Assignee: Windmöller & Hölscher, Lengerich.Westf. (DE)

( * ) Notice: Subject to any disclaimer, the term of this patent is extended or adjusted under 35 U.S.C. 154(b) by 0 days.

(21) Appl. No.: 09/317,606

(22) Filed: May 25, 1999

(30) Foreign Application Priority Data

May 25, 1998 (DE) .......................................... 198 23 304

(51) Int. Cl.[7] .......................................... B29C 47/006
(52) U.S. Cl. ................... 425/133.5; 425/378.1; 425/379.1; 425/462
(58) Field of Search ................... 425/133.5, 379.1, 425/378.1, 462

(56) References Cited

U.S. PATENT DOCUMENTS

| | | | | |
|---|---|---|---|---|
| 3,477,099 A | * | 11/1969 | Lee et al. ................. | 425/133.5 |
| 3,920,365 A | * | 11/1975 | Mules ........................ | 425/141 |
| 3,941,551 A | * | 3/1976 | Marion ........................ | 425/463 |
| 4,483,669 A | * | 11/1984 | Hahn et al. ............... | 425/131.1 |
| 4,484,883 A | | 11/1984 | Honda et al. ............... | 425/462 |
| 4,548,570 A | | 10/1985 | Hahn et al. .................. | 425/141 |
| 5,223,276 A | | 6/1993 | Djordjevic et al. ....... | 425/131.1 |
| 5,516,474 A | * | 5/1996 | Cloeren .................. | 264/171.23 |

FOREIGN PATENT DOCUMENTS

| | | | |
|---|---|---|---|
| DE | 39 29 002 | 3/1991 | |
| DE | 92 16 920 | 4/1994 | |
| EP | 0 625 419 A1 | * 11/1994 | ........... B29C/47/16 |

OTHER PUBLICATIONS

JP 10156920 A, Takiron, Jun. 16, 1998, Production of Synthetic Resin Laminated Molding Provided with Functional Coating Resin Layer.
JP 6106599 A, Mitsubishi, Apr. 19, 1994, Co–Extruding Feed Block.
JP 61134220 A, Toyo Seikan, Jun. 21, 1986, Plastic Multi—Layer Co—Extrusion Die.

* cited by examiner

Primary Examiner—Robert Davis
Assistant Examiner—Joseph S. Del Sole
(74) Attorney, Agent, or Firm—Jacobson Holman, PLLC

(57) ABSTRACT

A device for extruding multilayer plastic films, boards or tubes with a feed block, whose inputs are fed with polymer melts and which conveys the polymer melts from its inputs via individual layer channels to a slotted passage, forming its output. Temperature control units are arranged spaced part in the feed block along a width of to the individual layer channels for the purpose of heating or cooling.

15 Claims, 2 Drawing Sheets

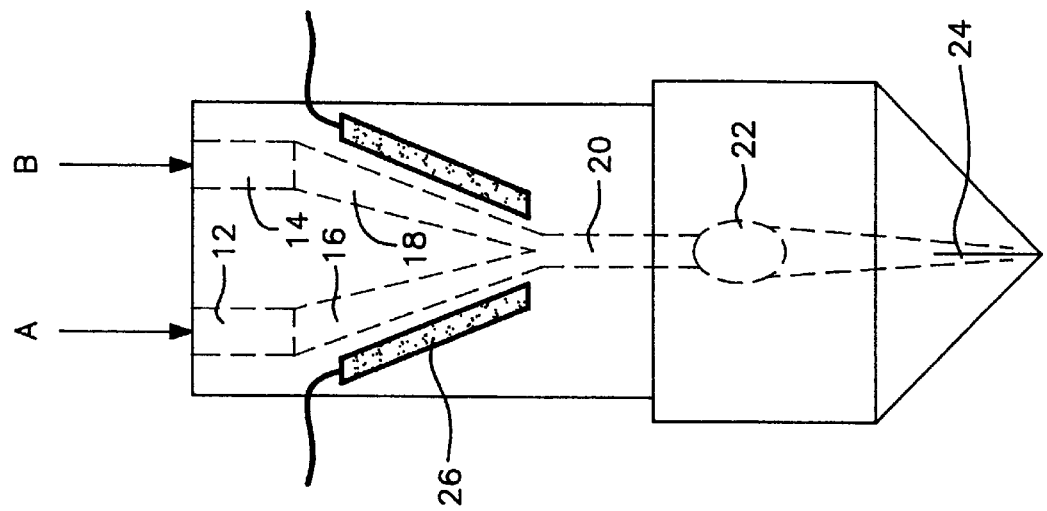
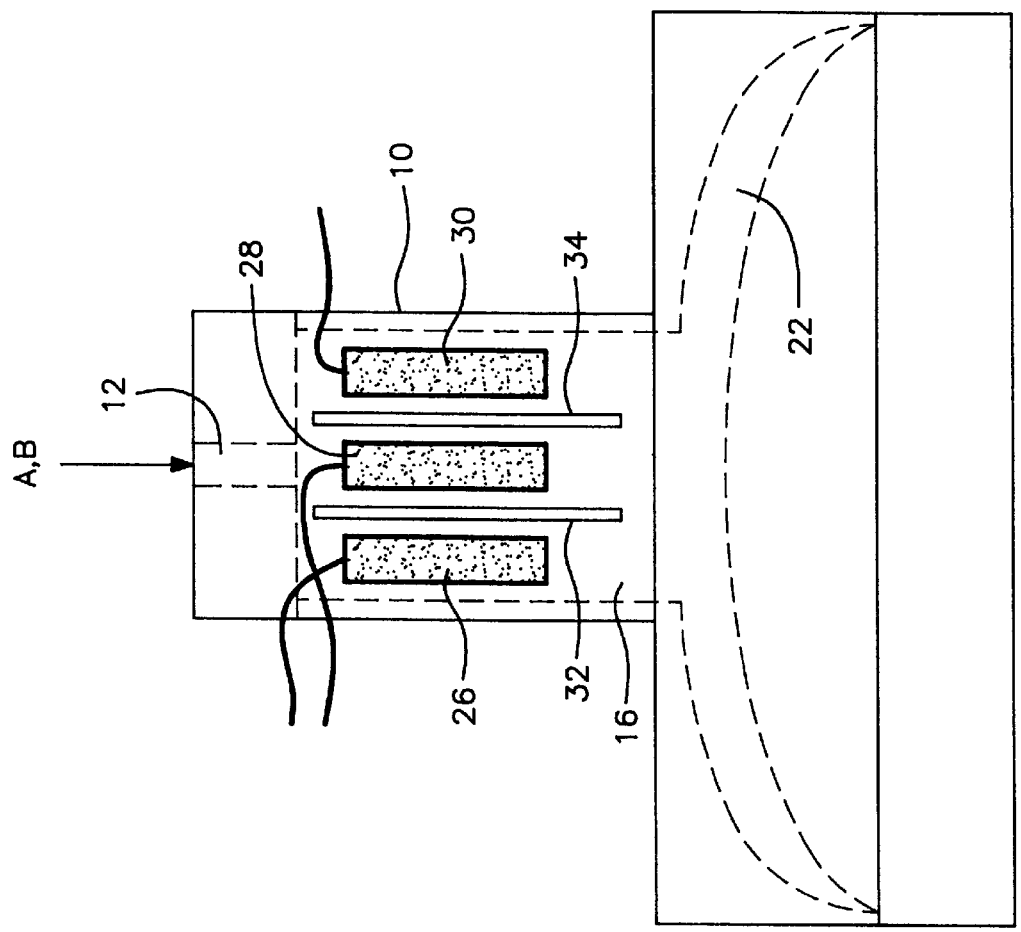

DEVICE FOR THE EXTRUSION OF MULTI-LAYER PLASTIC FILMS, BOARDS OR TUBES

BACKGROUND OF THE INVENTION

1. Field of the Invention

The invention relates to a device for the extrusion of multi-layer plastic films, boards or tubes with a feed block, whose inputs are fed with polymer melts and which conveys the polymer melts from its inputs via individual layer channels to a slotted passage, forming its output.

2. Description of the Related Art

To manufacture flat films, there exist extruders with slit dies, from which various polymers are extruded into a sandwich-like arrangement of layers. In the case of this kind of slit die, which is disclosed, for example, in the DE 39 29 002A, different melt streams, issuing from several extruders, are conveyed through a feed block into a sandwich-like arrangement of layers, after which process the sandwich-like melt spreads out in a clothes hanger-like cavity while retaining its sandwich-like arrangement of layers, so that an expanded polymer strand is extruded, in which the sandwich-like arrangement of layers of different melts is retained.

The DE 92 16 920 U discloses an extrusion die, which utilizes and modifies in such a manner the conversion of different polymer melts, which issue, as explained above, from the slit dies, into a sandwich-like layered strand and the final expansion of this strand in a clothes-hanger-like cavity while retaining the sandwich-like layer that the sandwich-like cavity is curved in the shape of a circle so that its legs converge into each other and the cavity changes into the subsequent annular channel, which leads to the annular gap of the extrusion die.

If at this point two or more polymer melts with different viscosity are processed in one of the prior art extrusion dies, the layer thickness is automatically unevenly distributed over the width of the coextruded films. The polymer melt with the lower viscosity expands more in the edge region than in the center region. To avoid these uneven layer thicknesses caused by the prior art feed blocks, mechanical control units, such as pins or restrictor bars, were used that were supposed to have such an impact on the individual layers of polymer melts that, after issuing from the die, a uniform individual layer profile is obtained. Since these mechanical systems usually dip into the melt stream, in order to have an effect, they leave behind them a so called dead water region, i.e., a space where the melt flows more slowly and thus tends to burn.

SUMMARY OF THE INVENTION

Therefore, the object of the present invention is to provide a device to extrude multilayer plastic films, boards or tubes, in which process the individually coextruded layers exhibit the same layer thickness even when the polymer melts that are used exhibit different viscosity.

The invention solves this problem with the aforementioned class of device for extruding multilayer plastic films, boards or tubes in that temperature control units are arranged in the feed block parallel to the individual layer channels for the purpose of heating or cooling. Thus the temperature of the respective polymer melt stream and thus its viscosity can be set by means of several temperature control units, arranged side-by-side, over the width of the individual layer channels. In this manner the flow characteristics of the polymer melt stream can be adjusted to the viscosity and thus the flow characteristics of the coextruded polymer melt streams. The results are uniform layer thicknesses without the need for mechanical control units.

It is especially advantageous if the many temperature control units, arranged side-by-side, are thermally separated from each other. One example thereof constitutes separating walls, made of a heat insulating material for thermal separation. Thus it is guaranteed that the respective temperature control elements affect only the area of the polymer melt stream, whose viscosity is supposed to be affected in a specific way.

To produce a multilayer plastic film or board, a clothes hanger-like expansion of the melt line, as disclosed in principle in the DE 39 29 002 A1, can be attached to the feed block.

As an alternative a multilayer plastic tube can be formed by attaching a connecting adapter, which empties into an annular distributing chamber, which, when active, is designed approximately like a clothes hanger, and whose apex is centered relative to the connecting adapter, and whose legs wind around the internal insert, bordering the annulus, so as to increasingly approach the die gap, and which changes into an annular channel, leading to the die gap. This arrangement is already known from the DE 92 16 920 U of the applicant.

BRIEF DESCRIPTION OF THE DRAWINGS

Other details and advantages of the invention are explained in detail with reference to one embodiment depicted in the drawings.

FIG. 1 is a diagrammatic front view of the device of the invention.

FIG. 2 is a diagrammatic side view of the device, according to FIG. 1.

DETAILED DESCRIPTION OF THE PREFERRED EMBODIMENTS

Figure 3:
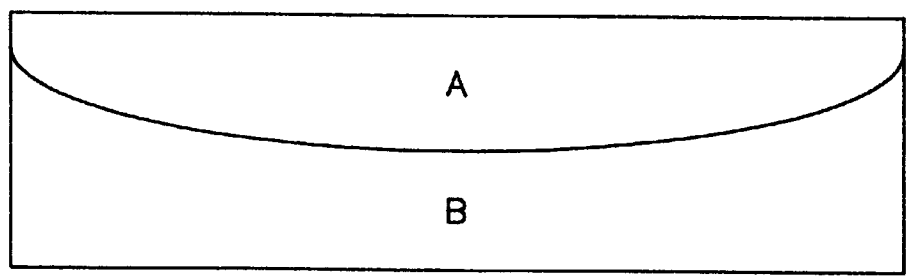
FIG. 3 depicts a layer distribution of a two layer film, whose polymer melt components exhibit different viscosity at uniform feed temperature over the width of the film, and in which the viscosity of layer A is greater than the viscosity of layer B.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIGS. 1 and 2 are schematic drawings of a device for extruding multilayer plastic films, which comprise two layers A and B. The polymer melts A and B of varying viscosity are fed into the inputs 12 and 14 of a feed block 10. They flow in individual layer channels 16 and 18 and are united in a slit-like passage 20, from where they are conveyed into a clothes-hanger-like expansion 22 of the melt line. In this clothes hanger-like expansion of the melt line the coextruded film spreads out and is fed to a slotted output gap, the die orifice 24.

As shown in FIGS. 1 and 2, heating cartridges 26, 28 and 30 are arranged over the width of the individual layer channels 16 and 18. These electrically heatable heating cartridges heat the center or edge regions of the plastic melt.

Each of the two individual layer channels 16 and 18 has its own heating cartridge, as evident from FIG. 2.

Between the heating cartridges 26, 28 and 30 there are thermal separating walls 32 and 34 made of a heat insulating material; said walls result in better thermal separation of the different temperature regions, as adjusted by the heating cartridges 26, 28 and 30.

With the aid of FIGS. 3 to 5, the effect of the temperature adjustment according to the invention on the different heating zones will be explained in detail. FIG. 3 is an example of the layer distribution of the coextruded two layer film, as it issues from the die orifice 24, when the viscosity of the polymer melt A is greater than the viscosity of the polymer melt B and when no measures are initiated to equalize the viscosity.

Figure 4:
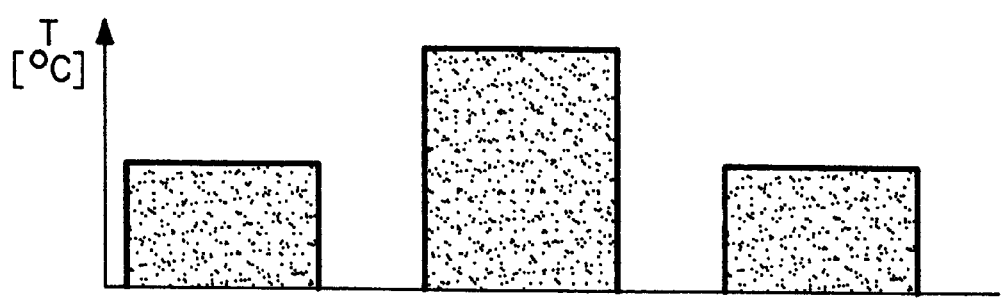
FIG. 4 depicts a temperature adjustment of the heating zones on the feed block side of the polymer melt stream A for the purpose of affecting the viscosity distribution of layer A and FIG. 5 depicts an ideal coextruded layer distribution, obtained by adjusting the temperature according to FIG. 4.
Figure 5:
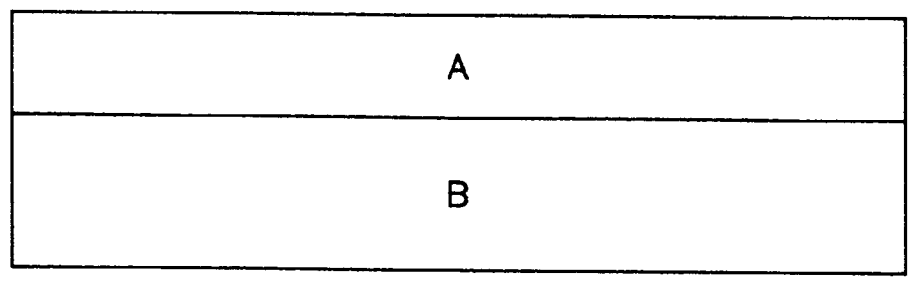

FIG. 4 shows a temperature profile, which reproduces for the polymer melt A the adjusted temperature of the heating cartridges 26, 28, 30 in the region of the individual layer channel 16. As shown here, the temperatures of the heating cartridges 26 and 30 are set comparatively lower than those of the center heating cartridge 28. In this manner in particular the viscosity in the central region of the melt layer A is reduced so that the result is an equalization of the layer thickness, as shown in the ideal case in FIG. 5.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for extruding multilayer plastic films, boards or tubes with a feed block, having inputs that are fed with polymer melts and which conveys the polymer melts along a melt line from said inputs via individual layer channels to a slotted passage forming an output, said feed block comprising a plurality of temperature control units spaced apart from one another along a width of, and adjacent to, each individual layer channel within the feed block to provide temperature differentials within each polymer melt layer, said width being transverse to a flow direction of said polymer melt layers, a longitudinal axis of said temperature control units being substantially parallel to said flow direction.

2. The device as claimed in claim 1, further comprising thermal separation between the temperature control units.

3. The device as claimed in claim 1, further comprising a clothes hanger-like expansion of the melt line attached to the output of the feed block.

4. The device as claimed in claim 1, further comprising, attached to the slotted passage of the feed block, a connecting adapter which empties into an annular distributing chamber which, when active, has a clothes hanger-like shape with an apex centered relative to the connecting adapter, and having legs that wind around an internal insert so as to increasingly approach a die orifice for extrusion of said polymer melt, said chamber changing into an annular channel leading to the die orifice.

5. A device for extruding a multilayer plastic film, comprising:
   a feed block having a plurality of inputs leading to a respective plurality of individual layer channels, said inputs being fed with polymer melts and said plurality of individual layer channels conveying the polymer melts along a melt line from said inputs to an output;
   a plurality of temperature control units spaced apart from one another along a width of, and adjacent to, each individual layer channel within the feed block to provide temperature differentials within each polymer melt layer, said width being transverse to a flow direction of said polymer melts; and
   a slit-like passage between the plurality of individual layer channels and the output, within which said polymer melts from said individual layer channels are united to form a single coextruded film.

6. The device as claimed in claim 5, and further comprising thermal separating walls between the temperature control units of each individual layer channel for enhancing the temperature differentials.

7. The device as claimed in claim 5, and further comprising a clothes-hanger-like expansion of the melt line attached to the output of said feed block in which said coextruded film spreads out and is fed to a die orifice.

8. The device as claimed in claim 6, and further comprising a clothes-hanger-like expansion of the melt line attached to the output of said feed block in which said coextruded film spreads out and is fed to a die orifice.

9. A device for extruding a multilayer plastic film, comprising:
   a feed block having two inputs leading respectively to first and second individual layer channels, each of said inputs being fed with a respective first and second polymer melt and said first and second individual layer channels respectively conveying said polymer melts from said inputs to an output in a respective first and second flow direction;
   a first plurality of temperature control units spaced apart from one another along a width of, and adjacent to, said first individual layer channel within the feed block to provide a temperature differential across said width, said width being transverse to said first flow direction; and
   a second plurality of temperature control units spaced apart from one another along a width of, and adjacent to, said second individual layer channel within the feed block to provide a temperature differential, said width of said second individual layer channel being transverse to said second flow direction.

10. The device as claimed in claim 9, further comprising:
a slit-like passage connecting the first and second individual layer channels to the output and within which said first and second polymer melts from said first and second individual layer channels are united to form a single coextruded film.

11. The device as claimed in claim 9, further comprising:
thermal separating walls between each of the first plurality of temperature control units; and
thermal separating walls between each of the second plurality of temperature control units.

12. The device as claimed in claim 11, further comprising:
a slit-like passage connecting the first and second individual layer channels to the output and within which said first and second polymer melts from said first and second individual layer channels are united to form a single coextruded film.

13. The device as claimed in claim 12, said first plurality of temperature control units including a central unit and two edge units, said central unit having a temperature higher than a temperature of said two edge units when said first polymer melt has a viscosity greater than a viscosity of said second polymer melt such that a thickness of said first polymer melt is uniform across said single coextruded film.

14. The device as claimed in claim 9, said first plurality of temperature control units including a central unit and two edge units.

15. The device as claimed in claim 10, further comprising a clothes-hanger-like expansion of the melt line attached to the output of said feed block in which said coextruded film spreads out and is fed to a die orifice.

* * * * *